UNITED STATES PATENT OFFICE.

JOHANN G. W. STEFFENS, OF BROOKLYN, NEW YORK.

IMPROVEMENT IN COMPOSITIONS FOR ORNAMENTS.

Specification forming part of Letters Patent No. 169,053, dated October 19, 1875; application filed October 5, 1875.

*To all whom it may concern:*

Be it known that I, JOHANN G. W. STEFFENS, of Brooklyn, in the county of Kings and State of New York, have invented a new and Improved Composition for Imitation Stone, &c., of which the following is a specification:

This invention relates to a new compound for producing a hard glossy substance that can be worked into articles for toilet use, jewelry, fancy articles of all kinds, such as boxes, &c., and, in fact, take the place of corals, ivory, hard rubber, and other expensive materials now in use.

The invention is based upon the use of curd, which forms the basis of my composition, and which, when properly treated, produces a hard glossy substance, as stated, which substance will not be affected by water or alcohol.

In carrying my invention into effect I take about one hundred parts of dry curd, and mix it with about ten parts of suitable alkali, preferably soda, which I further prefer to use after it has been crumbled in the air. This mixture of soda and curd is, in a suitable kettle, brought to a boiling-heat, and properly stirred, the effect being that the soda will saponify the animal matter and produce a sticky translucent mass. This mass constitutes the basis of my invention. I may add to it while it is still in the kettle about five parts of gelatine, to give greater consistency to the substance, and I may, after the gelatine, also add about two parts of starch, dissolved in water, to aid in giving a glossy appearance; but the starch and gelatine may be omitted.

Whether gelatine and starch are used or not, I next inspect the mixture, and add to it one or two parts of soda, provided the mixture should not be of the consistency which I desire, for its consistence will vary with the ordinary variations in the quality of the curd. I next add to the mixture, while it is still in the kettle, a suitable proportion of coloring substance, in order to produce the desired shade. Finally, and while the substance is still in the kettle, I add to it a small proportion of gum-tragacanth or other resinous substance, treated with linseed-oil while molten, and then properly stir it in the mixture.

The mixture is now allowed to cool, and produces, when cold and dry, a hard glossy substance of the required shade, which, when pressed in proper molds, will produce articles of the desired form; but this mixture, though not soluble in alcohol, may still be affected by water, and in order to make it insoluble in water I treat it, before pressing in molds, as follows: I steep the substance produced by the aforementioned process in whey or in milk, and then subject it to pressure between the heated molds. The molds must be heated in order to soften the composition, and allow it to assume the required shape. After pressure I steep the pieces in cold water containing a very small proportion of oil of vitriol, and thereby fix the mass so as to make it practically insoluble in water.

Articles prepared from this composition may be used wherever ivory is now used, the composition containing about the same degree of hardness and elasticity as ivory itself. The mixture may also be used where coral is now employed, as articles of ornamentation or jewelry, also for boxes, picture and mirror frames, and other suitable devices. In fact, the usefulness of this substance is almost unlimited, as it may take the place of wood for many articles of manufacture—even in furniture, &c.

I claim as my invention—

1. The composition of curd, alkali, and resinous substance, as described.

2. The process herein described, of fixing the composition of curd, alkali, and resinous substance specified, by steeping it in whey or milk before pressing, and in cold water containing oil of vitriol after pressure, as set forth.

J. G. W. STEFFENS.

Witnesses:
- A. V. BRIESEN,
- F. V. BRIESEN.